(No Model.)
F. M. BARBER.
FRUIT STAND.
No. 421,540. Patented Feb. 18, 1890.
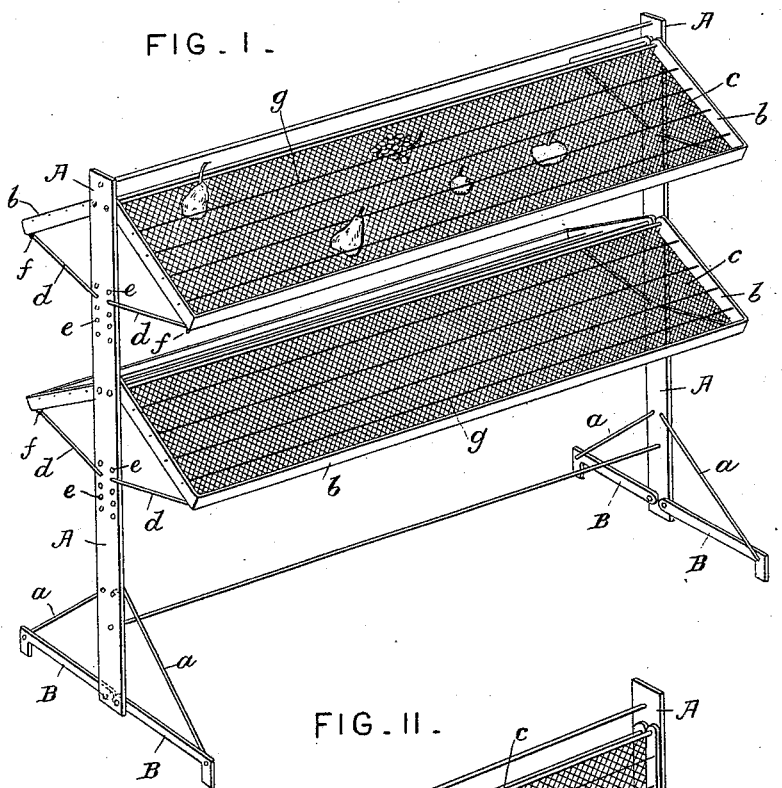
FIG. I.
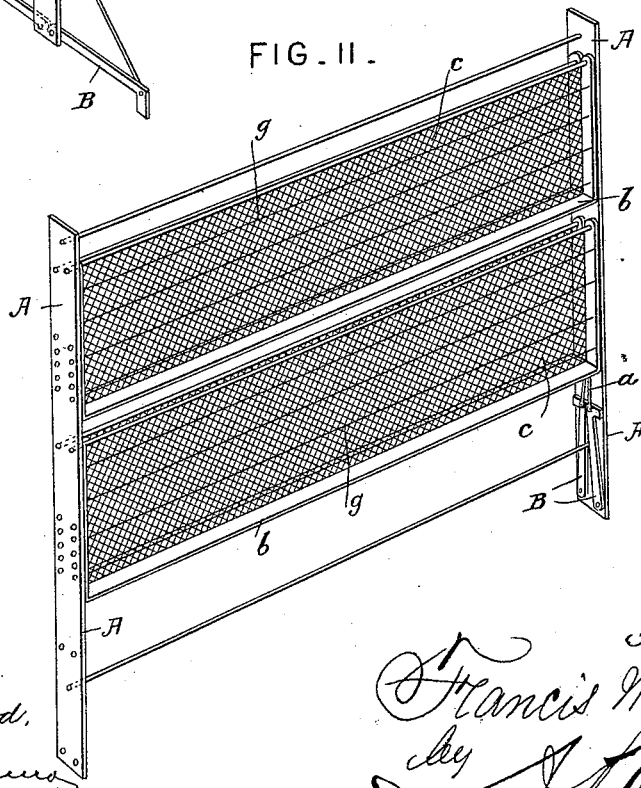
FIG. II.
Attest:
G. T. Smallwood.
Philip Mauro
Inventor
Francis M. Barber
by
his attorney

UNITED STATES PATENT OFFICE.

FRANCIS M. BARBER, OF WASHINGTON, DISTRICT OF COLUMBIA.

FRUIT-STAND.

SPECIFICATION forming part of Letters Patent No. 421,540, dated February 18, 1890.

Application filed October 5, 1889. Serial No. 326,115. (No model.)

*To all whom it may concern:*

Be it known that I, FRANCIS M. BARBER, of Washington, in the District of Columbia, have invented a new and useful Improvement in Fruit-Stands, which improvement is fully set forth in the following specification.

This invention has reference to the construction of fruit-stands for domestic and other use, its object being to furnish a device whereon perishable food articles—such as fruits and vegetables—may be preserved for some time in good condition without artificial refrigeration.

To this end the fruit-stand consists of a suitable support or frame to which are hinged or otherwise attached a series of shelves composed of open-work or reticulated material, such as wire mesh. The fruit resting on these shelves is exposed on all sides to the air, so that decay is arrested and the fruit preserved in good condition for a long period of time, So far as I am aware there is no device for this purpose at present available for domestic use, except the ordinary provision safes and refrigerators, and it is well known that fruit and vegetables when laid on pantry-shelves or on the ground, or kept in baskets or boxes, quickly decay on the side in contact with the support upon which they rest.

According to this invention the shelves of the fruit-stand are supported in such manner that they can be let down, and the whole stand when not in use can be folded up and set out of the way. For greater convenience the shelves are adapted to be held when in use at an angle, and means are provided whereby the degree of inclination may be varied.

In the accompanying drawings, which form part of this specification, Figure I is a perspective view of a fruit-stand constructed in accordance with the invention open for use, and Fig. II is a similar view of the stand closed.

The stand may conveniently be formed of two standards A, resting on feet B, the latter being pivoted to the standards A, so that they may be folded up, as shown in Fig. II. When opened, the feet are stayed by rods *a*.

The shelves are composed of a rectangular frame *b*, of wood or other material, supporting the bottom *c*, of wire mesh or equivalent open-work or reticulated material. These shelves are hinged at their upper ends to the standards A and hang vertically between them when not in use. (See Fig. II.) When in use, they are opened, as shown in Fig. I, and supported, preferably, in an inclined position by rods *d*, which fit at one end in holes *e* in standards A, and at their outer ends engage eyes *f* on shelves *b*. The degree of inclination of shelves *b* is determined by the position of the inner ends of supporting-rods *d*, a series of holes *e* being provided for the purposes of adjustment. It is preferred to support the shelves at an angle, as shown, for the greater convenience in giving access to the different articles thereon, and because the contents of the shelves can be more easily examined.

To prevent the fruit or other articles placed on the shelves from falling off, as well as to keep the several articles out of contact with each other, a series of wires *g* is extended across the shelves a short distance above the perforated bottom *c*.

The form of fruit-stand shown and described is that deemed to be the best embodiment of the invention; but it is obvious that the form of the supporting-frame and other details of construction may be varied without departing from the spirit of the invention.

The fruit-stand, while specially designed as a domestic article, may with advantage be used by dealers for holding and displaying fruit and the like.

I claim as my invention—

1. A stand for holding fruit and other perishable articles, said stand comprising, in combination, a frame, a series of shelves composed of reticulated material—such as wire mesh—hinged to said frame one above the other, so that they can be swung to different angles or folded up entirely, if desired, and rods or supports for the several shelves, substantially as described.

2. A fruit-stand provided with shelves of reticulated material hinged to a suitable frame, and adjustable supporting devices for said shelves, substantially as described.

3. A fruit-stand provided with a shelf or shelves of reticulated or open-work material having longitudinal wires a short distance above the shelves, in combination with means for supporting said shelves at an angle, substantially as described.

4. A fruit-stand comprising, in combination, the following elements: an upright supporting-frame, shelves pivoted thereto, detachable holding devices for said shelves, and feet pivoted to the frame, substantially as described.

In testimony whereof I have signed this specification in the presence of two subscribing witnesses.

FRANCIS M. BARBER.

Witnesses:
PHILIP MAURO,
JOSEPH HAGMANN.